(12) United States Patent
Calluaud et al.

(10) Patent No.: US 7,406,050 B2
(45) Date of Patent: Jul. 29, 2008

(54) SIMULATION AND TEST SYSTEM FOR AT LEAST ONE ITEM OF EQUIPMENT ON AN AFDX NETWORK

(75) Inventors: Jean-Marie Calluaud, Toulouse (FR); Emmanuel Cloury, Daux (FR)

(73) Assignee: Airbus France, Toulouse (FR)

( * ) Notice: Subject to any disclaimer, the term of this patent is extended or adjusted under 35 U.S.C. 154(b) by 537 days.

(21) Appl. No.: 11/081,609

(22) Filed: Mar. 17, 2005

(65) Prior Publication Data

US 2005/0220029 A1 Oct. 6, 2005

(30) Foreign Application Priority Data

Apr. 2, 2004 (FR) .................................. 04 50661

(51) Int. Cl.
H04L 12/26 (2006.01)
G06F 11/00 (2006.01)
(52) U.S. Cl. ......................................... 370/250; 714/38
(58) Field of Classification Search .................. None
See application file for complete search history.

(56) References Cited

U.S. PATENT DOCUMENTS

2007/0180325 A1* 8/2007 Bailey et al. .................. 714/38

OTHER PUBLICATIONS

Miguel A. Sanchez-Puebla, et al., "A new approach for distributed computing in avionics systems", Proceedings of the 1st International Symposium on Information and Communication Technologies, XP-002307664, Sep. 24, 2003, pp. 579-584.
"AFDX-PM-2CTR, Versatile High Performance AFDX Bus Interface", Tech S.A.T. GmbH, http://web.archive.org/web/ 20030411225527/217.6.59.26/download/afdx/afdx_pmc_2ctr_datasheet.pdf, XP-002307555, Apr. 11, 2003, 2 pages.
"CES White Paper on AFDX (Avionics Full Duplex Switched Ethernet)", Creative Electronic Systems, http://www.ces.ch/documents/downloads/afdx_white_paper.pdf, XP-002307590, Nov. 25, 2003, pp. 1-21.
Jan Peleska, "Automated Test Suites for Modern Aircraft Controllers", http://www.Informatik.uni-bremen.de/agbs/jp/papers/rss2003_peleska.ps, XP-002307665, Jan. 14, 2003, 10 pages.
"An AFDX-based flight test system" by Hervé Gachette, Philippe Rico and François-Henri Worm Creative Electronic Systems; pp. 1-11, May 2004 (Internet address: http://www.sfte.org/newsletter/euro_4-1.pdf).
"AIM to provide common standard AFDX databus analysers for the Airbus A 380" pp. 1-2, Oct. 17, 2003 (AIM company press review at internet address: http://www.airforcetechnology.com/contractors/manufacturing/aim/press1.html).
"AIM's new PMC card supports avionics testing for AFDX and ARINC-664 applications on the A 380/A 400M and B 7E7 Aircraft" pp. 1-2, Feb. 18, 2004 (AIM company press review at internet address: http://www.airforce-technology.com/contractors/manufacturing/aim/press3.html).

* cited by examiner

*Primary Examiner*—Melvin Marcelo
*Assistant Examiner*—Clemence Han
(74) *Attorney, Agent, or Firm*—Oblon, Spivak, McClelland, Maier & Neustadt, P.C.

(57) ABSTRACT

The invention relates to a system for simulating at least one item of equipment missing on an AFDX network and for testing such a network comprising at least one real item of equipment, which uses non-specific computer means including:

a simulation layer (21) controlling at least one Ethernet controller (22), at least one commercially available Ethernet switch (42) to switch data.

8 Claims, 4 Drawing Sheets

SIMULATION AND TEST SYSTEM FOR AT LEAST ONE ITEM OF EQUIPMENT ON AN AFDX NETWORK

TECHNICAL DOMAIN

This invention relates to a simulation and test system for at least one item of equipment on an AFDX network.

STATE OF PRIOR ART

Document reference [1] mentioned at the end of the description describes a flight test system based on a redundant Avionics Full Duplex switched Ethernet type communication network, called an "AFDX network".

The technical domain to which the invention is applicable is based on the simulation of equipment not installed on such an AFDX ("Avionics Full Duplex") network or testing of such a network. It is known that special electronic cards can be used in this domain, like those described for example in documents reference [2] and [3].

There is an inescapable need to integrate all real equipment and simulated equipment in an integration simulator or test bench. The objective for equipment dialoguing with an AFDX network is to find a simple network architecture capable of managing several items of simulated AFDX equipment, and that is representative of real time behaviours of real equipment.

At the present time, AFDX cards available on the market are applicable for a single item of equipment ("mono End System"). Therefore one AFDX card is necessary for every item of equipment to be simulated. FIG. 1 illustrates a simulation architecture in an example of such a network configuration.

The objective in this simulation architecture is to contain two items of equipment to be simulated, A and B, on the AFDX network 10. One of these items of equipment is connected to the specific AFDX switch 11, and the other to the specific AFDX switch 12. As seen from the network 10, exchanged information must respect real time constraints required by the switches. These two items of equipment to be simulated, A and B, are hosted on the simulation hardware and software system 15 in the form of functions A1, A2 and B. AFDX data are transferred by a specific AFDX controller 16 or 17 for each item of equipment. These AFDX controllers 16 and 17 respect real time constraints applicable for this type of equipment. These constraints are stricter than constraints set by the AFDX switches.

As in the case of a large integration simulator, there can be more than about fifty items of equipment to be simulated. This solution quickly becomes very difficult and expensive to set up.

The purpose of the invention is to overcome this constraint and to simulate at least one item of equipment using COTS ("Commercial off the shelf") products.

PRESENTATION OF THE INVENTION

The invention relates to a system for simulating at least one item of equipment missing on an AFDX network and for testing such a network comprising at least one real item of equipment, characterised in that it uses non-specific computer means including:
a simulation layer controlling at least one Ethernet controller,
at least one commercially available Ethernet switch to switch the data.

The non-specific computer means advantageously include:
a processing device including Ethernet connections means, means of sequencing sending of Ethernet frames capable of placing Ethernet frames at the right time to satisfy network requirements, and means of receiving Ethernet frames,
at least one Ethernet switch including means of making a connection between a 1 Gigabit link and a 100 Gigabit link capable of absorbing indeterminate time differences related to operation of the previous components.

Advantageously, the processing device includes formatting means capable of formatting simulation data to obtain a frame, and deformatting means capable of receiving and formatting AFDX data.

In a multi end system simulation, the switch may be a commercially available switch configured to segregate different sub-networks and to route outgoing Ethernet frames to ports connected to the network and incoming Ethernet frames to the processing device.

Advantageously, each Ethernet switch is such that:
it complies with the requirements of standard IEEE 802.3 that defines the Ethernet frame and the physical layer,
it has one 1 GBit/s port and two 100 Mbits/s ports for smoothing,
it has one 100 Mbits/s port for each item of equipment to be simulated,
it routes messages from the destination MAC address,
it manages the total number of "multicast" MAC addresses that corresponds to the number of virtual links,
it prevents routing of a message if the message has already been routed once,
it can be remote configured by configuration of a static table.

The invention also relates to an aircraft simulator using a simulation system as defined above including:
a simulation workshop with the function of hosting avionics models or functions and communicating with other software sets through a data flow,
a data zone in which the contents of avionics information in AFDX messages are available,
an input/output engine awakened by a timer and including formatting, deformatting and frame sequencing functions.

DETAILED PRESENTATION OF PARTICULAR EMBODIMENTS

Figure 1:
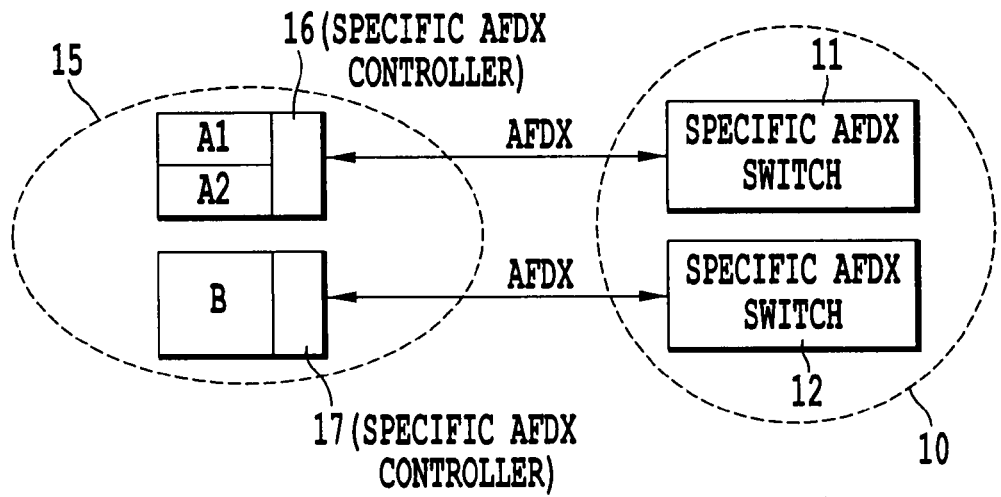
FIG. 1 illustrates an architecture according to known art.
Figure 2:
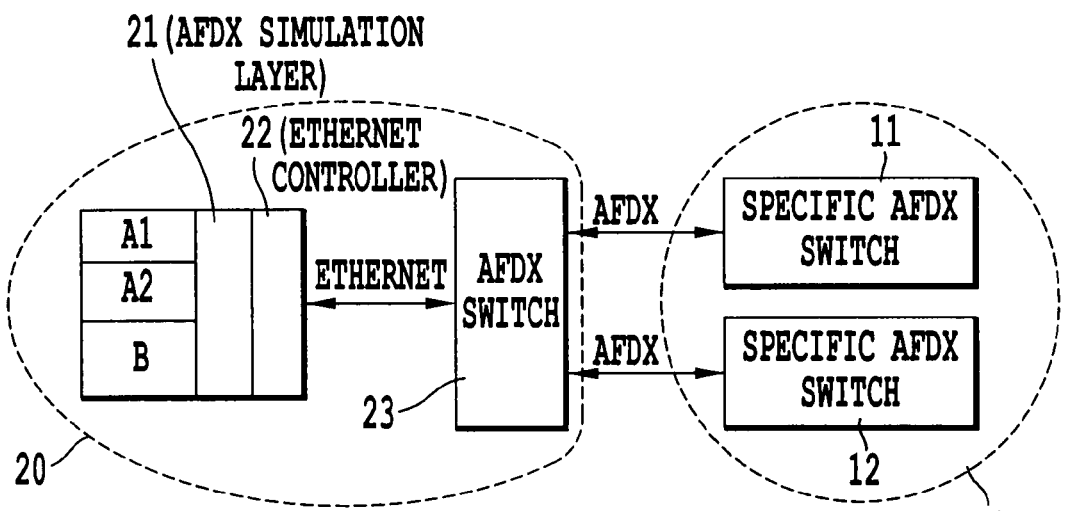
FIG. 2 illustrates the architecture of the system according to the invention.

FIG. 2 illustrates the simulation system according to the invention that uses an Ethernet controller 22 dedicated to the AFDX emulation and a commercially available switch 23, capable of satisfying the same need as that in the architecture in FIG. 1. In this system, an AFDX simulation layer 21 controlling the Ethernet controller 22 transfers the AFDX data that are switched by the commercially available Ethernet controller 23.

Figure 3:
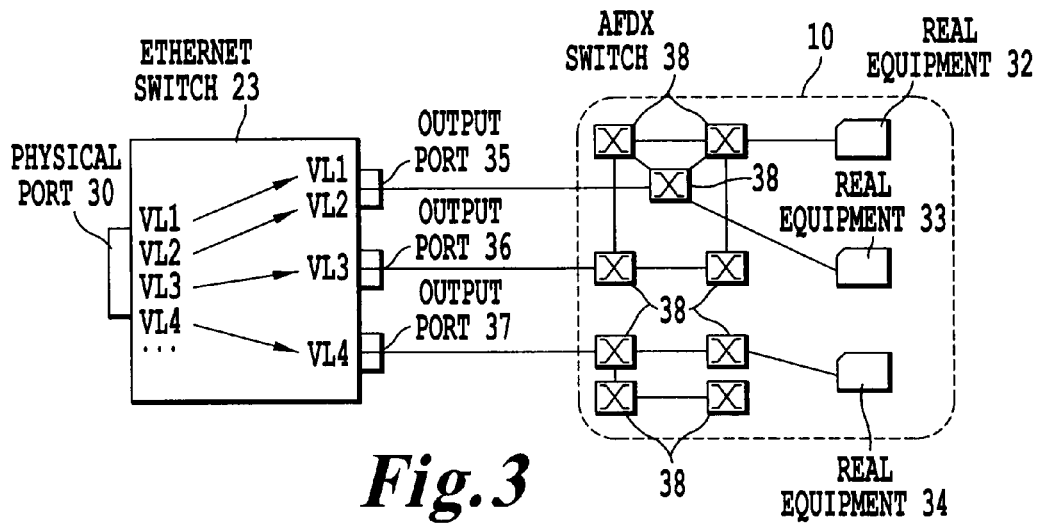
FIG. 3 illustrates the network geography concept.

To illustrate the data switching need to be satisfied by the Ethernet switch 23, we will consider the example in which three items of equipment are to be simulated on the network 10, as illustrated in FIG. 3. Information from the simulation system intended for the network 10 arrives at the connection port of the Ethernet switch 23 through a physical port 30 in the system. Each data originating from simulated equipment is then directed to an output port 35, 36 or 37 of the Ethernet switch 23 connected to the switch 38 corresponding to this equipment. An output port is selected to emulate one of the simulated items of equipment. Thus, the real equipment 32, 33 and 34 is shown in this figure.

Paths followed by the different data are grouped by "Virtual Link" (VL) for each item of equipment, to diagrammatically represent the internal operation expected of the Ethernet switch. A virtual link is a logical path between sending equipment and n receiving items of equipment along which information is circulated. In an AFDX network, two separate items of equipment are connected to each other through one or several switches 38.

At the physical level, the Ethernet and AFDX frames are identical, thus the AFDX protocols can be emulated using standard communication protocols and the Ethernet switch 23 and the AFDX switch 38 can exchange data without difficulty.

In sending, the AFDX traffic for the different items of equipment is multiplexed at the Ethernet card 22, and the Ethernet switch 23 routes virtual links to the different ports 35, 36 and 37, each of which represents one simulated item of equipment.

In reception, the process is the same but in reverse. The switch 23 receives traffic from the network 10 and filters data that are interesting for the simulation model to the Ethernet card 22 of the system 20.

In this type of architecture, the problems that arise are related to additional functions of the AFDX network such as management of the passband, associated time constraints, or redundancy. Therefore, the system becomes responsible for formatting and deformatting frames in accordance with AFDX specifications. Formatting refers to encapsulation of data by the UDP ("User Datagram Protocol"), IP ("Internet Protocol"), Ethernet and then AFDX layers.

But the main question that arises is the ability of this architecture to respect time constraints related to the AFDX network, and particularly the regularity of emissions on each virtual link so as to minimise jitter.

Figure 4:
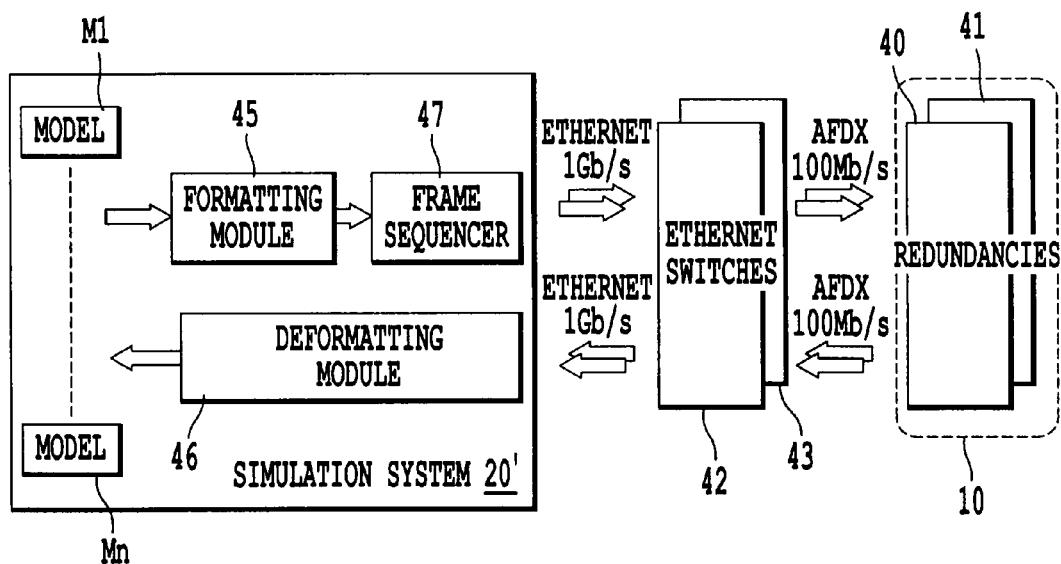
FIG. 4 illustrates a first embodiment of the system according to the invention.

FIG. 4 shows a first embodiment of the system according to the invention.

Each redundancy 40 and 41 in the network 10 is connected to an Ethernet switch 42 and 43 by 10/100 Mbs/s links emulating the equipment to be simulated. These switches 42 and 43 include a 1 Gb/s Ethernet network connection to the simulation system 20'. This simulation system hosts software subsets composed of functions of the simulated equipment, called models M1 ... M$_n$ of communication functions to the switches 42 and 43. These communication functions are formatting 45 to format simulation data to obtain an Ethernet and AFDX frame, deformatting 46 for reception and formatting of AFDX data in a format that can be used by the models and the frame sequencer 47 enabling management of timed transmission of AFDX data to the network 10.

The use of a switch 42 or 43 provides a means of reducing real time constraints on sending AFDX frames and distributing virtual links of the different equipment to be simulated.

As the number of simulated transmitting equipment increases, the number of virtual links, and even more so the number of messages, also increases. Thus, respecting real time constraints at the output from the system depends directly on the time necessary for the operating system to process a message. If the system uses a powerful processor and a real time operating system, it becomes possible to satisfy real time communication constraints with a standard protocol and to respect real time constraints of the switch 40 or 41.

The software frame formatting module 45 satisfies transmission requirements of the AFDX standard. Its main tasks are to change the source MAC ("Media Access Control") address to simulate real equipment, to change the destination MAC address to address the virtual link concerned and to calculate an SN ("Sequence number") for each virtual link at the end of the message to manage redundancy in sending.

The simulation system 20' uses two distinct Ethernet controllers (see references 65 and 66 on FIG. 8), themselves coupled to two distinct Ethernet switches 42 and 43, to send on the two networks 40 and 41.

The software module for deformatting frames 46 satisfies reception requirements of the AFDX standard. Redundancy on reception depends on IC ("Integrity checking") and the payload is stored available for models M1 ... Mn that need it.

We will now describe different characteristic points of the system according to the invention.

Placement Algorithm and Frame Sequencer

The frame sequencer module 47 and a placement algorithm are used to send all messages produced by simulated equipment respecting BAG ("Bandwidth Allocation Gap")/jitter constraints, from the simulation system 20, on the virtual links to which they belong.

The frame sequencer module is awakened cyclically by a timer to send messages determined by the placement algorithm. The timer frequency is also a result of the algorithm.

Therefore the purpose of the placement algorithm is to find the list of AFDX messages that have to be sent while guaranteeing BAG/jitter constraints of the virtual link and the message sending period. The sending period, that is specific to a message, is expressed in milliseconds and must necessarily be greater than the BAG of the virtual link to which the message belongs.

The Ethernet card 22 is assumed to be deterministic, in other words the precise duration necessary for sending each item of data by the card is predicted. The network is also assumed to be ideal; if there is a duration d between when two successive messages are sent on the same virtual link, then this duration d will be the same on reception.

The placement algorithm uses the simplifications described below, so as to be positioned on 128 ms intervals (the maximum value of the BAG for a virtual link). The message sending period is made consistent with the BAG by choosing a so-called simulated sending frequency that corresponds to a maximum value of {2n.BAGVL such that n>0 and 2n.BAGVL≦128 ms and 2n.BAGVL≦MessagePeriod}. Therefore, the additional assumption is made that the network accepts a reduction in the message periods.

The placement algorithm considers input consisting of all virtual links to be sent on the Ethernet controller. Each virtual link information contains the BAG of the virtual link, the jitter of the virtual link, the sizes of message payloads and the message period.

The result of the placement algorithm is a send chronogram.

For each interval with duration BAGmin, the result specifies which messages of which virtual links are sent. The purpose in the frame sequencer module 47 is a "broadcast" ("à la volèe") send without a time counter. As soon as sending one message is terminated, the next message is sent until all messages in the interval have been sent. The module then waits for the beginning of the next interval to resume sending.

BAG/jitter constraints participate in reducing the number of simulated transmitters that can be placed on the Ethernet card 23. They make it necessary to have organised transmissions, sometimes with waiting times. Sometimes, a wait is necessary before sending the next message to satisfy BAG/jitter constraints. In this case, the send chronogram specifies that a message called "FALSE VL" should be sent with a specified "payload" size. In practice, this is done by sending a frame with a specific MAC address that is routed to a port with no output in the switch.

BAG Fluctuation Smoothing Mechanism

The previous algorithm assumes that frames on a virtual link are spaced at exactly BAG milliseconds.

Figure 5:
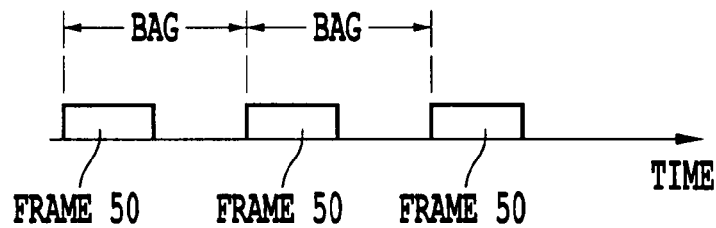
FIG. 5 illustrates the BAG constraint.

FIG. 5 illustrates the BAG concept that AFDX messages on a virtual link must satisfy. This is the minimum time interval separating transmissions for two consecutive frames 50.

However in reality, firstly hardware constraints and secondly implementation constraints (one item of equipment can send on several virtual links) will cause the interval between frames to fluctuate: this is the jitter phenomenon.

Figure 6:
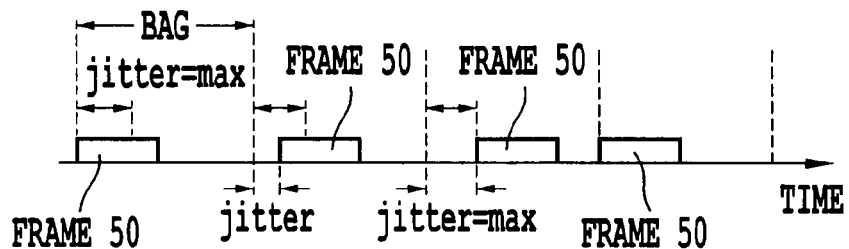
FIG. 6 illustrates the "jitter" phenomenon.

FIG. 6 represents another concept associated with the flow control requested when sending AFDX frames. For a virtual link, this relates to the maximum allowable jitter within which the BAG constraint is considered to be acceptable.

Thus, in order to satisfy assumption imposed by the placement algorithm as closely as possible, in other words an ideal network and a deterministic Ethernet controller, and to guarantee that the maximum jitter constraint is respected, messages from the different virtual links are sent on a Gigabit network between the system Ethernet controller and the switch 42 or 43. This data flow is looped back onto one or several 100 Mbits/s input ports, by configuration of the switch 42 or 43.

Thus, despite the jitter value introduced by the operating system and the Ethernet controller at the system output, the fact that the message transfer is 10 times faster results in bufferisation at the 1 Gigabit (1 gigabit/s) port of the switch 42 or 43, of messages to be looped back on the 100 Mbits/s port (10 times slower), such that jitter is completely absorbed and reduced to a value close to zero at the output from the 100 Mbits/s port. This smoothing mechanism thus provides a means of moving closer to the initial send chronogram calculated by the placement algorithm.

Figure 7:
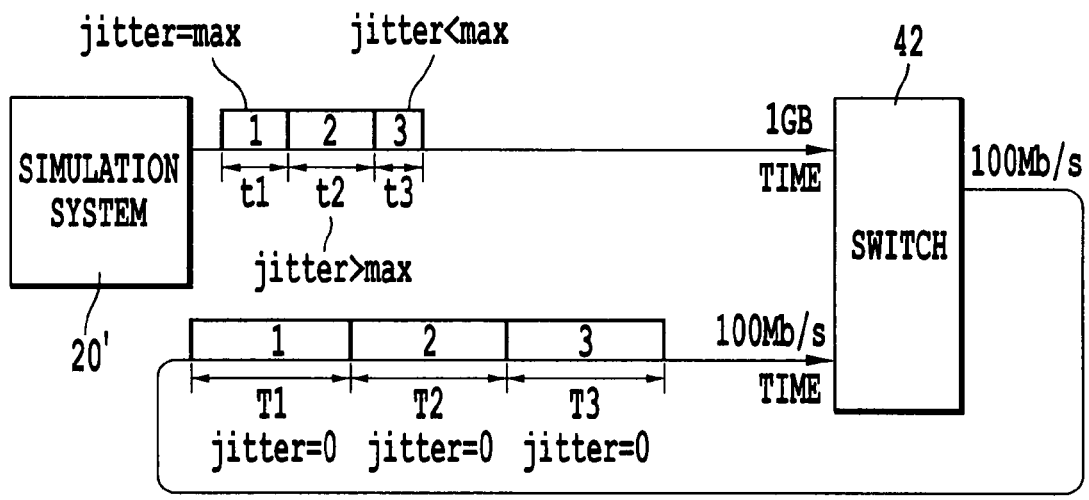
FIG. 7 illustrates the BAG fluctuations smoothing mechanism.

FIG. 7 illustrates the BAG fluctuation smoothing mechanism. AFDX frames are sent from the simulation system 20 on a 1 Gigabit link with indeterminism leading to a jitter phenomenon. The 1 Gigabit/s link is resent by the Ethernet switch 42 on a 100 Megabits/s link. The effect of this mechanism is to expand send times (in theory by a ratio of 10) and thus absorb jitters induced on the 1 Gigabit link to a value approaching zero on the 100 Megabits/s link.

This mechanism can be illustrated by considering a transmission of 1500 bytes, that requires about 12 μs on the 1 Gbit/s network and about 115 μs on the 100 Mbits/s network. Thus, the smoothing mechanism can completely absorb the jitter provided that the jitter value introduced by the operating system and the Ethernet controller is less than 115 μs-12 μs, namely about 100 μs.

Configuration of Switches

As before, the switch 42 is firstly involved in the smoothing mechanism and secondly controls routing of virtual links. Therefore, this solution uses switches in a particular manner in the sense that all their configurations are static.

Thus, for switch 42 or 43, the following VLANs ("Virtual Lane Networks") or logical switches have to be created:

A "smoothing" VLAN for smoothing BA fluctuations,

An "application" VLAN for routing virtual links to output ports connected to the real network, and to filter and authorise messages from the real network to the system.

Therefore each switch 42 or 43 must have at least the following capabilities:

comply with the requirements of standard IEEE 802.3 that defines the Ethernet frame and the physical layer, have one 1 GBit/s port and two 100 Mbits/s ports for smoothing, have one 100 MBits/s port for each item of equipment to be simulated, be able to route messages from the destination MAC address (OSI model level 2 switching), be capable of managing the total number of "multicast" (or multi-destination) MAC addresses that corresponds to the number of virtual links, be able to prohibit routing of a message when the message has already been routed once, be remote configurable by configuration of a static table.

Proprietary protocols can be deactivated (proprietary protocols (CDP, VTP . . .) or unnecessary protocols (ARP ("Address Resolution Protocol"), IGMP, etc.) to eliminate any parasite traffic).

Use in an Aircraft Simulator

Figure 8:
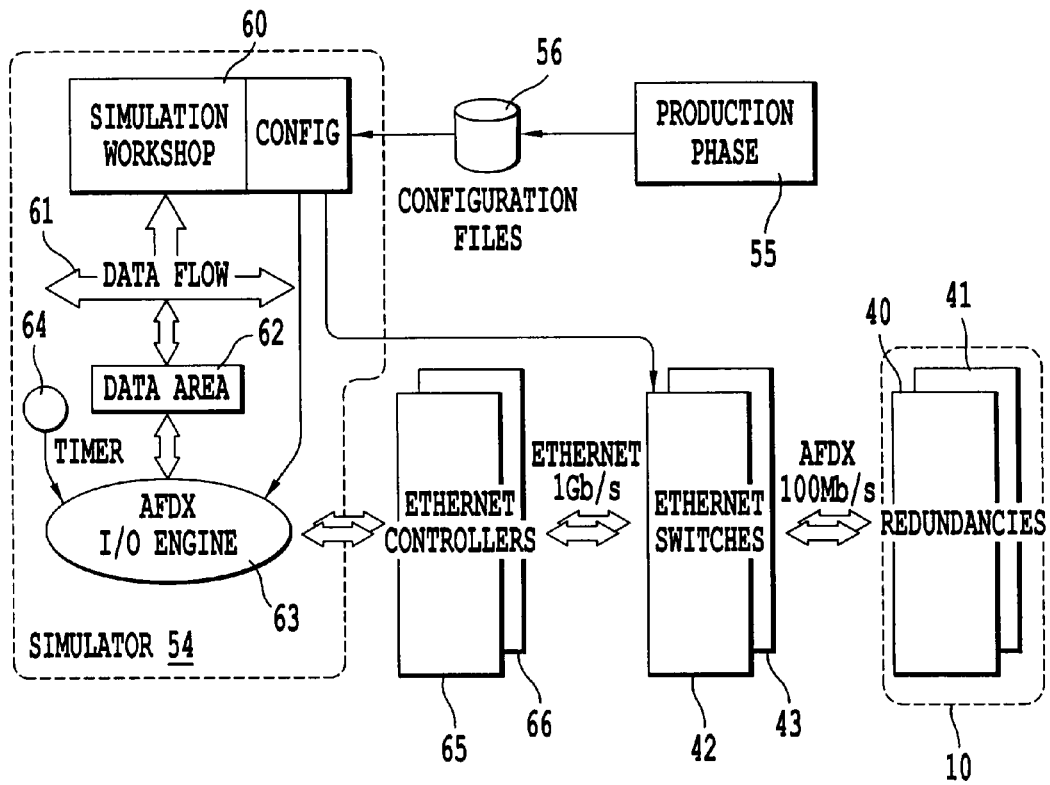
FIG. 8 illustrates an application of the system according to the invention in the context of an aircraft simulator.

FIG. 8 shows one proposed application of the system according to the invention for an aircraft simulator 54, to simulate onboard computers. It illustrates details of the software architecture set up on an aircraft simulator.

In this simulator, the software architecture of the simulation system according to the invention comprises a structure for input of models to be simulated, configuration files, input/output systems and data exchange memory areas.

The configuration files 56 necessary for the simulation environment are generated in a production phase 55.

The software simulation environment is composed of:

a simulation workshop 60 to host avionics models or functions and communicating with other software sets through a data flow 61.

a data area 62 called the AFDX input/output (I/O) area, in which the "payload" (contents of avionics information) of AFDX messages is kept available, an AFDX input-output engine 63 awakened by a timer 64 and including formatting, deformatting and frame sequencer functions.

This figure also shows the Ethernet controllers 65 and 66.

In this application, parameters necessary for implementation of AFDX communications are produced from a reference and are stored in different files.

AFDX data exchanges between simulation models and the input/output mechanism of the simulator are made through a shared memory (AFDX I/O area).

The sequencer of the engine 63 is awakened by the timer 64 in accordance with the send chronogram of the virtual links.

The performance measurements mentioned below were made in the context of this simulator.

The characteristics of the simulation system are as follows:
Digital Alpha station, quadri-processor,
Tru64 Unix operating system.
The following assumptions are made about simulated equipment:
number of redundant AFDX ports: 58,
number of virtual links in sending as a function of the BAG:

| BAG (ms) | 8 | 16 | 32 | TOTAL |
|---|---|---|---|---|
| Number of virtual links | 8 | 203 | 100 | 311 |
| Passband (Mbits/sec) | 3.7 | 47.4 | 11.7 | 62.8 |

Each virtual link comprises a 400-byte message. This size is the size necessary for application data ("payload") exchanged through the UDP/IP protocol. With the headers of the different protocols (UDP, IP, MAC, AFDX), this is equivalent to a packet size of 400+67=467 bytes.
number of virtual links in reception as a function of the BAG:

| | BAG (ms) | | | | |
|---|---|---|---|---|---|
| | 4 | 8 | 16 | 32 | TOTAL |
| Number of virtual links | 38 | 94 | 326 | 210 | 668 |
| Passband (Mbits/sec) | 35.5 | 43.9 | 76.1 | 24.5 | 180.0 |

Simulated systems do not subscribe to all virtual links: only to 10%.

A first measurement series was made with a hardware analyser at the output from the system to precisely quantify the jitter introduced by the system ("Operating System"+card "driver"+Ethernet card) when the placement algorithm is used:

10<Jitter (µs)<100

Complementary measurements assigned 3 µus of jitter due to awakening of the sequencer.

A second series of measurements was carried out with a hardware analyser at the input to the 100 Mbits/s port of the Ethernet controller to characterise absorption of jitter by the smoothing mechanism:

3<Jitter (µs)<10

The results obtained above demonstrate the efficiency of smoothing and demonstrate that the architecture according to the invention is compatible with the most severe maximum jitter (coefficient x1).

Other Possible Solutions

The solution selected above for the aircraft integration simulator may be:
simplified to be used in smaller test benches or with no severe real time constraints,
duplicated to be used in larger test benches or with less powerful COTS components,
optimised if the network will not accept a reduction in message periods or in the case in which the list of simulated equipment is dynamic,
reused to generate equipment emulators.

Reduction in the Number of COTS Components

Figure 9:
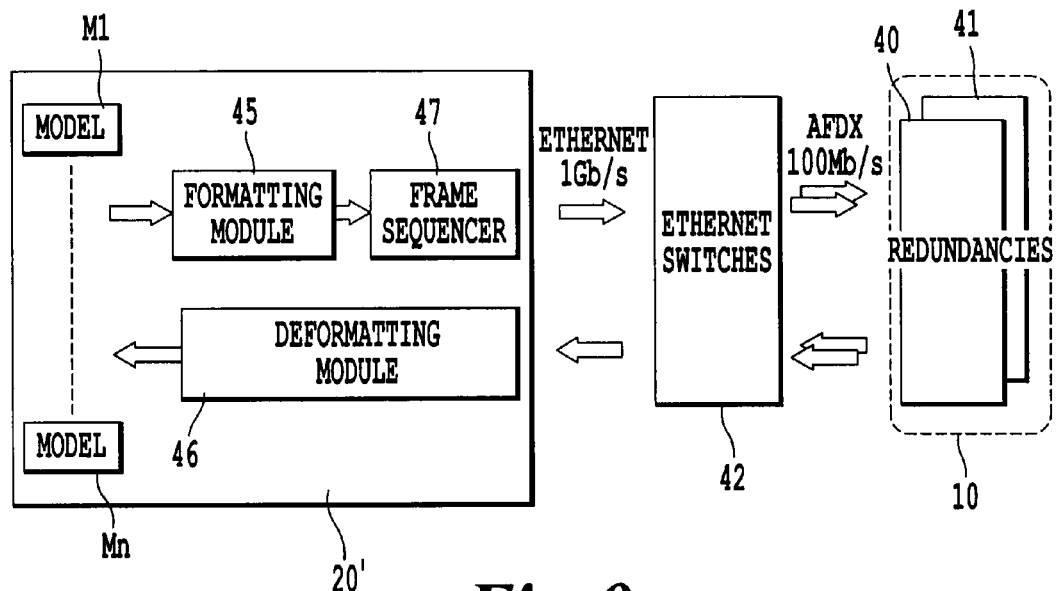
FIG. 9 illustrates a second embodiment of the system according to the invention.

The solution of treating AFDX redundancy (network A and network B) with two different Ethernet controllers/switches has been abandoned in the case of smaller test benches. The use of a single Ethernet controller/switch is sufficient if the passband necessary for two networks is less than 100 Mbits/sec. The diagram shown in FIG. 9 is a simplification of the architecture described in FIG. 4. The Ethernet switch configuration is reduced to a single switch that carries redundant information on the aircraft networks (network A and network B).

The placement algorithm is modified to take account of virtual links in the two networks. The Ethernet switch is then capable of filtering input messages by their source MAC address, so as to differentiate network A virtual links from network B virtual links.

Elimination of the Gigabit Network

The smoothing mechanism is eliminated if the gigabit network does not introduce any severe real time constraints. Thus, this type of solution uses a 100 Mbits/s link directly at the output from the system.

Increase in the Number of COTS Components

Conversely, several Ethernet controllers or switches are used in parallel to redistribute the load on virtual links for test benches in which the characteristics of COTS components are such that it is impossible to apply the solution as it is (too many messages to be sent, too many virtual links to be routed, etc.).

If the network will not accept a reduction in message periods, the placement algorithm is modified so as to no longer control the BAG of the message send period.

As described above, configuration files necessary for the implementation of AFDX communications are produced once and for all before the simulation is started. If the configuration of equipment to be simulated is not known in advance or if the characteristics of equipment to be simulated change, the production phase in which the placement algorithm is executed is called for each new configuration. These chronograms may be kept to accelerate the treatment for a previously requested configuration.

Equipment Emulator

The software for the system according to the invention can be reused in a PC type environment with a timer and Ethernet cards.

The input to the frame sequencer may be a source different from the placement algorithm, for example such as an AFDX record file or data originating from the AFDX network model.

Thus, a "mono End System" type emulator was made, the addition of a switch helping to satisfy the need for "multi-End system" emulators.

REFERENCES

[1] "An AFDX-based flight test system" by Hervé Gachette, Philippe Rico and Francois-Henri Worm (Creative Electronic Systems; Internet address: http://www.sfte.org/newsletter/euro_4-1.pdf, May 2004.)

[2] "AIM to provide common standard AFDX databus analysers for the Airbus A 380" (AIM company press review at internet address: http://www.airforcetechnology.com/contractors/manufactu ring/aim/press1.html, Oct. 17 2003.)

[3] "AIM's new PMC card supports avionics testing for AFDX and ARINC-664 applications on the A 380/A 400M and B 7E7 Aircraft" (AIM company press review at internet address: http://www.airforce-technology.com/contractors/manufacturing/aim/press3.htm 1, Feb. 18, 2004.)

The invention claimed is:

1. A system for simulating at least one item of equipment missing on an Avionics Full Duplex Switched Ethernet (AFDX) network, said system comprising:
   at least one Ethernet controller,
   a simulation layer configured to control said at least one Ethernet controller, and
   at least one Ethernet switch connected to said at least one Ethernet controller and configured to route a virtual link to an output port that is connected to an AFDX switch for said at least one item of equipment.

2. The system according to claim 1, comprising:
   a processing device including Ethernet connections, means for sequencing sending of Ethernet frames configured to place Ethernet frames at a time to satisfy network requirements, and means for receiving Ethernet frames,
   at least one Ethernet switch configured to make a connection between a 1 Gigabit link and a 100 Megabit link.

3. The system according to claim 2, wherein the processing device includes formatting means for formatting simulation data to obtain a frame, and deformatting means for receiving and formatting AFDX data.

4. The system according to claim 1, further comprising a plurality of Ethernet switches, wherein each Ethernet switch:
   complies with requirements of standard IEEE 802.3 that defines an Ethernet frame and a physical layer,
   has one 1 GBit/s port and two 100 Mbits/s ports for smoothing,
   has one 100 Mbits/s port for each item of equipment to be simulated,
   routes messages from a destination MAC address,
   manages a total number of "multicast" MAC addresses that corresponds to a number of virtual links,
   prevents routing of a message if the message has already been routed once, and
   can be remote configured by configuration of a static table.

5. The system of claim 1, wherein said Ethernet switch is connected between a first data link having a first data transfer speed and a second data link having a second data transfer speed, wherein a ratio of said first data transfer speed to said second data transfer speed is at least 10, and wherein said first data link is connected between said Ethernet switch and said simulation layer, and said second data link is connected between said Ethernet switch and said AFDX switch for said at least one item of equipment.

6. The system of claim 1, wherein said at least one item of equipment includes at least two items of equipment comprising a first item and a second item, wherein said Ethernet switch comprises at least two output ports including a first port and a second port, wherein said first item includes a first AFDX switch connected to said first port and said second item includes a second AFDX switch connected to said second port, and wherein said at least one Ethernet switch is configured to route a first virtual link to said first port and to route a second virtual link to said second port; and wherein said Ethernet switch is configured to receive data at said first and second ports and to direct them to said Ethernet controller.

7. A system, for simulating at least one item of equipment missing on an Avionics Full Duplex Switched Ethernet (AFDX) network, said system comprising:
   at least one Ethernet controller,
   a simulation layer configured to control said at least one Ethernet controller, and
   at least one commercially available Ethernet switch,
   wherein the Ethernet switch is configured to segregate different sub-networks and to route outgoing Ethernet frames to ports connected to the AFDX network and incoming Ethernet frames to a processing device.

8. An aircraft simulator using a simulation system for simulating at least one item of equipment missing on an Avionics Full Duplex Switched Ethernet (AFDX) network, said system comprising at least one commercially available Ethernet controller, a simulation layer configured to control said at least one Ethernet controller, and at least one Ethernet switch, wherein said aircraft simulator includes:
   a simulation workshop with the function of hosting avionics models or functions and communicating with other software sets through a data flow,
   a data zone in which contents of avionics information in AFDX messages are available,
   an input/output engine awakened by a timer and including formatting, deformatting and frame sequencing functions.

* * * * *